US011737479B2

(12) United States Patent
Heck et al.

(10) Patent No.: US 11,737,479 B2
(45) Date of Patent: Aug. 29, 2023

(54) HEAT STABLE EXTRUDED PROTEIN COMPOSITION AND RELATED FOOD PRODUCTS

(71) Applicant: General Mills, Inc., Minneapolis, MN (US)

(72) Inventors: Caleb I Heck, Champlin, MN (US); Steven C Robie, Champlin, MN (US); Goeran Walther, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 572 days.

(21) Appl. No.: 16/884,499

(22) Filed: May 27, 2020

(65) Prior Publication Data
US 2020/0288748 A1 Sep. 17, 2020

Related U.S. Application Data

(62) Division of application No. 15/564,483, filed as application No. PCT/US2015/025758 on Apr. 14, 2015, now abandoned.

(51) Int. Cl.
A23J 3/26 (2006.01)
A23L 33/17 (2016.01)
A23P 30/20 (2016.01)

(52) U.S. Cl.
CPC .............. A23J 3/26 (2013.01); A23L 33/17 (2016.08); A23P 30/20 (2016.08); A23V 2002/00 (2013.01)

(58) Field of Classification Search
CPC .......................................................... A23J 3/26
See application file for complete search history.

(56) References Cited

U.S. PATENT DOCUMENTS

| 4,418,086 A * | 11/1983 | Marino ............ A23J 3/26 426/805 |
| 4,539,212 A | 9/1985 | Hunter |
| 8,529,976 B2 | 9/2013 | McMindes |
| 2006/0057275 A1 | 3/2006 | Wu et al. |
| 2008/0075808 A1 | 3/2008 | Altemueller |
| 2008/0248167 A1 | 10/2008 | McMindes et al. |
| 2012/0093994 A1 | 4/2012 | Hsieh |
| 2012/0171351 A1 | 7/2012 | Solorio |

FOREIGN PATENT DOCUMENTS

| WO | WO 2015/020660 | 2/2015 |
| WO | WO 2015/020873 | 2/2015 |

OTHER PUBLICATIONS

Diaz et al., "Microbial, Physical-Chemical and Sensory Spoilage During the Refrigerated Storage of Cooked Pork Loin Processed by the Sous Vide Method", Meat Science, No. 80, pp. 287-292, 2008.

(Continued)

Primary Examiner — Elizabeth Gwartney
(74) Attorney, Agent, or Firm — Diederiks & Whitelaw, PLC; John L. Crimmins, Esq.

(57) ABSTRACT

The present disclosure relates to extruded protein compositions suitable for thermal processing and thermally processed protein compositions made from extruded protein compositions. In particular, a thermally processed protein composition has a particular protein content with protein fibers in a generally parallel orientation, and a particular hardness, chewiness and springiness.

13 Claims, 1 Drawing Sheet

(56) References Cited

OTHER PUBLICATIONS

Nurul et al., "*Quality Characteristics of Malaysian Commercial Beef Frankfurters*", International Food Research Journal, No. 17, pp. 469-476, 2010.
Lin et al., "Texture and Chemical Characteristics of Soy Protein Meat Analog Extruded at High Moisture", Journal of Food Science, vol. 65, No. 2, pp. 264-269, 2000.
Claus, "Methods for the Objective Measurement of Meat Product Texture", American Meat Science Association, vol. 48, pp. 96-101, 1995.
Soup, https://www.epicurious.com/archive/everydaycooking/tastetests/chickennoodletastetest, Jan. 30, 2009.

* cited by examiner

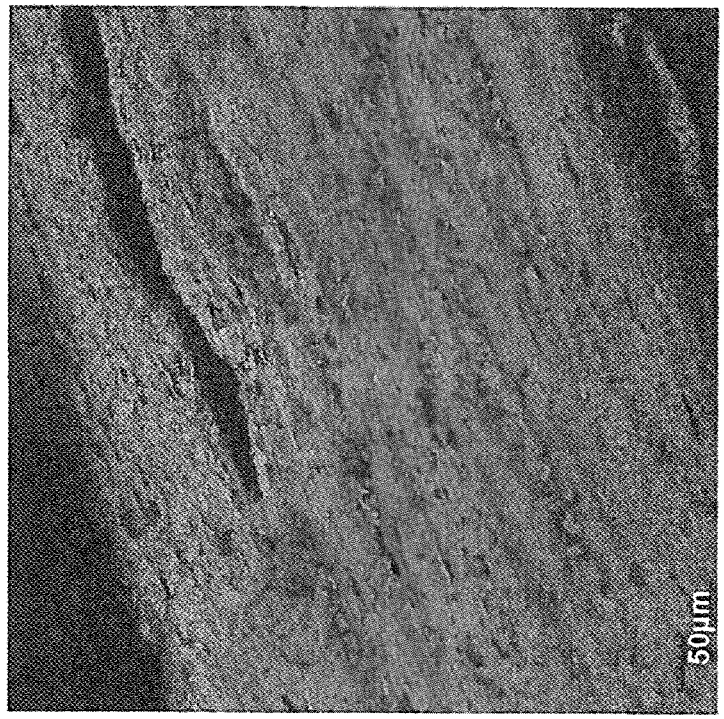
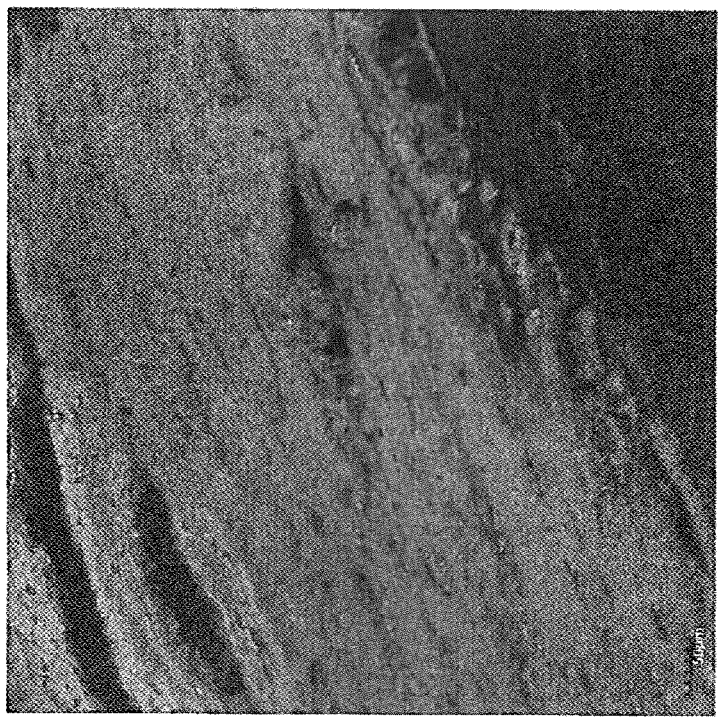

HEAT STABLE EXTRUDED PROTEIN COMPOSITION AND RELATED FOOD PRODUCTS

CROSS-REFERENCE TO RELATED APPLICATIONS

This application represents a divisional application of U.S. patent application Ser. No. 15/564,483, filed Oct. 5, 2017, entitled "Heat Stable Extruded Protein Composition and Related Food Products," pending, which is a National Stage application of PCT/US2015/025758, filed Apr. 14, 2015, and titled "Heat Stable Extruded Protein Composition and Related Food Products", the entire contents of which are incorporated herein by reference.

TECHNOLOGY

The present disclosure generally relates to heat stable extruded protein compositions and methods for producing a heat stable extruded protein composition.

BACKGROUND

Recent developments in extrusion have allowed for the production of extruded protein products made from animal derived and/or non-animal derived protein sources that have oriented fibers that are texturally similar to meat. Although taste and texture of such extruded protein products is approaching that of meat, thus far the utility of such meat analogs has been limited. Thus, there is a need for extruded protein products having oriented fibers that can be used in various commercially available products, including products that are commercially sterile or pasteurized as achieved by application of heat.

SUMMARY

Provided herein is a thermally processed protein composition. A thermally processed protein composition has a protein content of about 65% to about 90% or about 70% to about 85% by dry weight, where the protein forms protein fibers in a generally parallel orientation. A thermally processed protein composition has a hardness greater than 3 kg or greater than 4.5 kg, a chewiness greater than 10 kg*mm or greater than 15 kg*mm, and a springiness of at least 0.90.

A thermally processed protein composition provided herein can be commercially sterile or pasteurized.

In some embodiments, a thermally processed protein composition can have a cohesiveness of greater than 0.5.

In some embodiments, a thermally processed protein composition can have an oil content of about 1% to less than 15%, or from about 3% to about 10%, by dry weight.

In some embodiments, a thermally processed protein composition can include a starch, a hydrocolloid, or a softener.

Also provided herein is a packaged food product including a thermally processed protein composition.

In some embodiments, a packaged food product provided herein can be packaged in a can, a pouch, a tray, a box, or a tub.

In some embodiments, a packaged food product can be a soup or a shredded protein product.

Further provided herein is a method of making a packaged food product. The method includes producing a thermally processed protein composition by applying to a heat stable extruded protein composition heat in an amount sufficient to render the heat stable extruded protein composition pasteurized or commercially sterile, where the thermally processed protein composition has protein fibers in a generally parallel orientation and a protein content of about 65% to about 90% or about 70% to about 85% by dry weight, a hardness greater than 3 kg or greater than 4.5 kg, a chewiness greater than 10 kg*mm or greater than 15 kg*mm, and a springiness of at least 0.90; and packaging the thermally processed protein composition in a hermetically sealed container. In some embodiments, the heat stable extruded protein composition is placed in the hermetically sealed container prior to applying heat to produce the thermally processed protein composition.

In some embodiments, the heat stable extruded protein composition is thermally processed with or in a liquid comprising a coloring agent or a flavoring agent.

In some embodiments, a method can further include the step of producing the heat stable extruded protein composition from a stream comprising a proteinaceous composition having a protein content of about 65% to about 90% by dry weight, a moisture content of from about 45% to about 56%, and an oil content of up to about 15% by dry weight at a barrel temperature of from about 270° F. to about 330° F.

In some embodiments, a method can further include the step of producing the heat stable extruded protein composition from a stream comprising a proteinaceous composition having a protein content of about 65% to about 90% by dry weight, a moisture content of from about 45% to about 56%, and an oil content of up to about 15% by dry weight, and heating the stream to a temperature of from about 240° F. to about 330° F.

These and various other features and advantages will be apparent from a reading of the following detailed description.

BRIEF DESCRIPTION OF THE DRAWINGS

FIG. 1 shows confocal laser scanning photomicrographs of an extruded protein product having oriented fibers at 20× magnification.

DETAILED DESCRIPTION

While extrusion technology has begun to produce protein products that have an enjoyable texture, while reducing or eliminating the use of animal protein, the use of such meat analogs in various commercially available products has been limited. For instance, it has been discovered that many commercially available plant-based meat analogs are not suitable for thermal processing because they disintegrate during thermal processing or because they provide an unpleasant texture after thermal processing. Methods and compositions disclosed herein provide a novel solution for the need for plant-based meat analogs that can be thermally processed and still provide an enjoyable eating experience.

Provided herein is a heat stable extruded protein composition that provides an enjoyable eating experience due to a novel set of physical properties following thermal processing, including protein fiber orientation, hardness, chewiness, cohesiveness, and springiness. A heat stable extruded protein composition that has been thermally processed (i.e., has been pasteurized or rendered commercially sterile) is referred to herein as a "thermally processed protein composition."

As used herein, the term "pasteurized" refers to the condition achieved by the application of heat at a temperature and time sufficient to achieve a $10^6$ (i.e., 6D) reduction in vegetative cells of *Clostridium botulinum* type E and non-proteolytic types B and F. As used herein, the term "commercially sterile" refers to the condition achieved by the application of heat which renders a food free of microorganisms capable of reproducing in the food under normal non-refrigerated conditions of storage and distribution and free of viable microorganisms (including spores) of public health significance (21 C.F.R. § 113.3(e)(1)(i), Apr. 1, 2014).

A thermally processed protein composition provided herein includes a protein content of about 65% to about 90% by dry weight (e.g., about 70% to about 85%) that forms protein fibers oriented in a generally parallel orientation. Protein fibers oriented in a generally parallel orientation can contribute a texture that is similar to meat. It is to be understood that protein fibers that are in a generally parallel orientation need not be oriented linearly. In some embodiments, fibers that are oriented in a generally parallel orientation can be oriented in linear (e.g., longitudinal in the direction of extrusion flow) or curved manner. The fibers need not be perfectly parallel and can overlap and still provide a desired texture to thermally processed protein composition provided herein.

The density and length of protein fibers in a thermally processed protein composition can be adjusted to produce structures similar to different kinds of meat, such as chicken, beef, lamb, pork, fish, and the like. It is to be understood, however, that a thermally processed protein product provided herein need not have a structure identical to or indistinguishable from meat.

In addition to protein fibers oriented in a generally parallel orientation, a thermally processed protein composition described herein also has a hardness greater than 3 kg (e.g., greater than 4.5 kg), a chewiness greater than 10 kg*mm (e.g., greater than 15 kg*mm), and a springiness of at least 0.90 (e.g., 0.90 to 1.0). Without being bound to theory, it is believed that a hardness greater than 4.5 kg, a chewiness greater than 15 kg*mm, and a springiness of at least 0.90 contribute to a texture of a thermally processed protein composition upon biting that mimics a meat, such as chicken, beef, or pork.

As used herein, the term "hardness" of a thermally processed protein composition refers to peak force measured during a first compression of a sample. In order to measure hardness of a thermally processed protein composition, pieces that are 10 mm in height, 15 mm wide, and 15 mm long are used. Appropriately sized pieces can be made by cutting the extruded protein composition to the specified size prior to thermal processing or by cutting the thermally processed protein composition following thermal processing. Each piece is placed on the base of a TA.HDPlus Texture Analyzer (Texture Technologies, Massachusetts, USA) directly below the compression cylinder, where the Texture Analyzer is fitted with a 30 kg load cell, base frames with metal flat plate insert, and compression cylinder that is a minimum of 1.5 inches in diameter, and calibrated to a probe height of 12 mm, speed of 2 mm/sec, and contact force of 10 g. Each piece is subjected to a two cycle compression program with the following settings: speed=2 mm/sec, post-test speed=2 mm/sec, compression distance=6.5 mm, count=2. Hardness is calculated as the peak force of the first compression measured in kilograms, averaged over at least 10 pieces.

As used herein, the term "springiness" of a thermally processed protein composition refers to how well the thermally processed protein composition springs back after it has been deformed after a first compression. In order to measure springiness of a thermally processed protein composition, pieces that are 10 mm in height, 15 mm wide, and 15 mm long are prepared as for measuring hardness. Each piece is placed on the base of a TA.HDPlus Texture Analyzer directly below the compression cylinder, where the Texture Analyzer is fitted with a 30 kg load cell, base frames with metal flat plate insert, and compression cylinder that is a minimum of 1.5 inches in diameter, and calibrated to a probe height of 12 mm, speed of 2 mm/sec, and contact force of 10 g. Each piece is subjected to a two cycle compression program with the following settings: speed=2 mm/sec, post-test speed=2 mm/sec, compression distance=6.5 mm, count=2. Springiness is calculated as the ratio of the height of the thermally processed protein composition piece prior to the first compression to the height of the thermally processed protein composition piece after the first compression and prior to the second compression, averaged over at least 10 pieces. Springiness is a unitless measurement.

As used herein, the term "chewiness" of a thermally processed protein composition refers to the product of hardness, cohesiveness, and springiness of the thermally processed protein composition. In order to measure chewiness of a thermally processed protein composition, pieces that are 10 mm in height, 15 mm wide, and 15 mm long are prepared as for measuring hardness. Each piece is placed on the base of a TA.HDPlus Texture Analyzer directly below the compression cylinder, where the Texture Analyzer is fitted with a 30 kg load cell, base frames with metal flat plate insert, and compression cylinder that is a minimum of 1.5 inches in diameter, and calibrated to a probe height of 12 mm, speed of 2 mm/sec, and contact force of 10 g. Each piece is subjected to a two cycle compression program with the following settings: speed=2 mm/sec, post-test speed=2 mm/sec, compression distance=6.5 mm, count=2. Chewiness is calculated as hardness, measured in kilograms, multiplied by springiness and cohesiveness, averaged over at least 10 pieces.

As used herein, the term "cohesiveness" of a thermally processed protein composition refers to how well the thermally processed protein composition adheres to itself under some compressive or tensile stress. In order to measure cohesiveness of a thermally processed protein composition, pieces that are 10 mm in height, 15 mm wide, and 15 mm long are prepared as for measuring hardness. Each piece is placed on the base of a TA.HDPlus Texture Analyzer directly below the compression cylinder, where the Texture Analyzer is fitted with a 30 kg load cell, base frames with metal flat plate insert, and compression cylinder that is a minimum of 1.5 inches in diameter, and calibrated to a probe height of 12 mm, speed of 2 mm/sec, and contact force of 10 g. Each piece is subjected to a two cycle compression program with the following settings: speed=2 mm/sec, post-test speed=2 mm/sec, compression distance=6.5 mm, count=2. Cohesiveness is calculated as the area of work during the second compression divided by the area of work during the first compression, averaged over at least 10 trimmed pieces. Cohesiveness is a unitless measurement.

In some embodiments, a thermally processed protein composition provided herein can have a cohesiveness of greater than 0.50 (e.g., 0.50 to 0.70). In some embodiments, a cohesiveness of greater than 0.50 can further contribute to a texture of a thermally processed protein composition that mimics a meat.

A thermally processed protein composition provided herein is produced by thermal processing of an extruded protein composition. An extruded protein composition suitable for thermal processing has a protein content of about 65% to about 90% by dry weight, where at least some of the protein forms protein fibers oriented in a generally parallel orientation, a moisture content of about 45% to about 56% by weight, and an oil content of up to about 15% by dry weight.

A heat stable extruded protein composition suitable for use in thermal processing can be made by producing a stream comprising a proteinaceous composition and directing the stream through an elongated die (e.g., a die with a round or rectangular cross section, or an annular die) to produce an extruded protein composition having protein fibers oriented in a generally parallel orientation.

A stream comprising a proteinaceous composition can be produced using any appropriate method and equipment. For example, in some embodiments, a stream can be produced using an extruder. An extruder suitable for use in the methods provided herein can include, for example, a single screw, twin screw, or triple screw extruder, or a ring extruder. For example a co-rotating, intermeshing, twin screw extruder can be used in a method provided herein. Manufacturers for co-rotating twin screw extruders include, for example, Coperion, Wenger, Clextral, Bersttorf, APV, Buhler, and Leistritz. Manufacturers for single screw extruders include, for example, Wenger, APV, and Buhler.

Temperature and/or viscosity of a stream can be adjusted to adjust flow behavior, flow balance, or other stream properties, such as melting of protein in an extruder, and/or cooling, gelling, setting, and oriented protein fiber formation in the die. For example, a stream can reach a temperature of from about 240° F. to about 330° F. (e.g., from about 250° F. to about 300° F.) during extrusion.

In some embodiments, barrel temperature of an extruder can be controlled in order to adjust the temperature of a stream during extrusion. For example, an extruder barrel can be heated to a temperature of from about 270° F. to about 330° F. (e.g., from about 270° F. to about 315° F.). In some embodiments, only a portion of an extruder barrel is at a temperature of from about 270° F. to about 330° F. For example, in a modular extruder, one or more sections (e.g., the last 2-4 sections of the barrel) can be at a temperature of from about 270° F. to about 330° F. As used herein, the term "barrel temperature" refers to the temperature of all or a section of an extruder barrel.

A proteinaceous composition provided herein includes a protein component that can form oriented protein fibers. A protein component includes at least one non-animal derived protein. A non-animal derived protein can be derived from any appropriate non-animal source (e.g., plant, algae, bacteria, fungi, yeast, and the like). Examples of sources for plant derived proteins include legumes (e.g., soy, pea, pulses such as beans and lentils, and the like), seeds (e.g., canola, quinoa, and the like), grains (e.g., wheat oat, rice, and the like). Examples of non-animal derived proteins include, but are not limited to, partially or fully purified proteins in the form of protein concentrates or protein isolates (e.g., zein, gluten, soy protein isolate, soy protein concentrate, and the like).

In some embodiments, a proteinaceous composition can also include an animal derived protein. An animal derived protein can be derived from any appropriate animal source (e.g., meat, egg, dairy, and the like) from any appropriate animal (e.g., poultry, bovine animals, pigs, horses, fish, sheep, goats, deer, and the like). Examples of animal derived proteins include, but are not limited to, crude mixtures of proteins (e.g., mechanically deboned meat, surimi, minced meat, meat paste, dehydrated milk, and the like), or partially or fully purified proteins (e.g., gelatin, casein, whey, albumin, milk protein isolate, and the like). In some embodiments, an animal derived or non-animal derived protein for use in a process provided herein can be a derivative (e.g., isomer, hydrolysate, salt form) of a natural protein.

The protein content of a proteinaceous composition suitable for use in making an extruded protein composition provided herein can range from about 65% of the weight of the dry ingredients to about 90% of the weight of the dry ingredients. For example, based on the dry weight of the proteinaceous composition, the protein content of a proteinaceous composition can be from about 70% to about 85%. The amount of protein and/or type of protein in a proteinaceous composition can be adjusted in order to adjust the protein content or texture of an extruded protein product produced from the proteinaceous composition. In some embodiments, the protein content in a proteinaceous composition can be adjusted in order to adjust the viscosity, gelling properties, water binding properties, oil binding properties, emulsifying properties, or shear properties of the proteinaceous composition. In some embodiments, the type of a protein component included in a proteinaceous composition can determine the protein content of a proteinaceous composition. For example, a proteinaceous composition including soy protein isolate, which has a protein content of about 90% by dry weight, in an amount of about 80% by weight of the dry ingredients can have a protein content of about 72% by weight of the dry ingredients.

A proteinaceous composition suitable for use in making an extruded protein composition provided herein can have a moisture content of at least about 45% by weight of the proteinaceous composition. For example, the moisture content can be from about 45% to about 56%. The moisture content of a proteinaceous composition can be adjusted in order to adjust the moisture content or texture of an extruded protein product produced from the proteinaceous composition. In some embodiments, the moisture content in a proteinaceous composition can be adjusted in order to adjust the viscosity or shear properties of the proteinaceous composition to result in the desired hardness, cohesiveness, springiness, and/or chewiness of an extruded protein product made using the proteinaceous composition. In some embodiments, the moisture content in a proteinaceous composition can be adjusted in order to adjust the solubility of one or more other components in the proteinaceous composition.

A proteinaceous composition suitable for use in making an extruded protein composition provided herein can have an oil content of up to about 15% (e.g., from about 1% to less than 15% or from about 3% to about 10%) of the proteinaceous composition. Examples of suitable oils include, but are not limited to, canola oil, sunflower oil, olive oil, soy bean oil, sesame oil, cotton seed oil, rice bran oil, corn oil, peanut oil, safflower oil, fish oil, algae oil, krill oil, flax oil, and the like.

In some embodiments, a proteinaceous composition suitable for use in making an extruded protein composition provided herein, also includes one or more other components including, without limitation, a carbohydrate component, a pH adjusting agent, a flavoring agent, a coloring agent, a macronutrient, a micronutrient, a vitamin, a mineral, and the like. The amount and type of additional components in a proteinaceous composition can be adjusted in order to adjust the nutritional value, flavor, aroma, color, appearance and/or texture of an extruded protein product produced from the proteinaceous composition. In some embodiments, the amount and type of additional components in a protein composition can be adjusted in order to adjust the viscosity, gelling properties, water binding properties, oil binding properties, emulsifying properties, or shear properties of the proteinaceous composition. In some embodiments, the amount and type of additional components in a proteinaceous composition can be adjusted in order to adjust the solubility of one or more other components in the proteinaceous composition.

Examples of a coloring agent include, but are not limited to, natural colors (e.g., caramel coloring, annatto, betanin, lycopene, beta carotene, cochineal extract, fruit extracts, vegetable extracts, and the like), artificial dyes (e.g., FD&C Blue No. 1, FD&C Blue No. 2, FD&C Green No. 3, FD&C Red No. 3, FD&C Red No. 40, FD&C Yellow No. 5, FD&C Yellow No. 6, and the like), lakes (e.g., carmine, and the like), and other additives that impart color (e.g., dihydroxyacetone, hydrogen peroxide, titanium dioxide, and the like).

Examples of a hydrocolloid include, but are not limited to, a pectin, a gum (e.g., xanthan gum, gum Arabic, gum ghatti, gum tragacanth, chicle gum, dammar gum, mastic gum, tara gum, spruce gum, psyllium seed husk, gellan gum, guar gum, locust bean gum, konjac gum, and the like), an alginate, a cellulose, an agar, and a carrageenan.

Examples of a carbohydrate include, but are not limited to, a native starch, a modified starch (e.g., pre-gelatinized, hybrid, modified, hydrolyzed, mechanically, chemically, thermally, enzymatically modified, modified by high pressure), a monosaccharide (e.g., glucose, fructose), an oligosaccharide (e.g., sucrose, lactose, maltose, maltodextrin), a soluble fiber (e.g., beta-glucan, inulin, fructan, polydextrose), an insoluble fiber (cellulose, hemicellulose, dextrin), and a modified fiber. A carbohydrate can be added as a purified carbohydrate or as part of an ingredient such as a grain (e.g., wheat, barley, corn, rice, rye, millet, oat, or the like) or pseudo grain (e.g., amaranth, quinoa, buckwheat, and the like) flour.

Examples of a softener or polyol include, but are not limited to sugar alcohols (e.g., glycerol, sorbitol), sugars, and propylene glycol.

Examples of an enzyme include, but are not limited to, a transglutaminase or other protein crosslinking enzyme, a peptide hydrolase, a lipase, an amylase, a protease, and a catalase.

Examples of a pH adjusting agent include, but are not limited to, an acid (e.g., citric acid, ascorbic acid, lactic acid, or other organic acid, or the like), a base (e.g., calcium hydroxide, sodium hydroxide, and the like), and a buffer.

Examples of a salt include, but are not limited to, organic salts (e.g., citrates, tartrates, sorbates, and the like) and inorganic salts (e.g., sodium chloride, magnesium chloride, calcium chloride, potassium chloride, bisulfites, metabisulfites, calcium phosphate, and the like).

Examples of a macronutrient include, but are not limited to carbohydrates, fats, protein, essential amino acids, and fatty acids. Examples of a micronutrient include, but are not limited to calcium, potassium, vitamins, organic acids, and the like.

Examples of methods and apparatuses suitable for making an extruded protein composition having fibers oriented in a generally parallel orientation can be found, for example, in WO/2015/020660 and WO/2015/020873, which are incorporated herein by reference in their entireties.

An extruded protein composition having fibers oriented in a generally parallel orientation is thermally processed to produce a thermally processed protein composition described herein. Any thermal processing method that achieves pasteurization or commercial sterility can be used to produce a thermally processed protein composition. Examples of suitable thermal processing methods include, for example, retort (e.g., water immersion, steam, water spray, and the like), low temperature long time pasteurization, high temperature short time pasteurization, ultra heat treatment, ohmic heating, microwave treatment, and the like. A thermal processing method can be used alone or in combination with one or more additional thermal processing method or non-thermal processing method, such as pressure treatment and pulsed electric field treatment.

In some embodiments, an extruded protein composition can be cut into pieces or shredded prior to thermal processing. Pieces can be of any suitable shape, such as spheres, cubes, cylinders, disks, annular disks, and the like. In some embodiments, pieces can be shaped to resemble meat products, such as meatballs, cubed chicken pieces or calamari.

In some embodiments, an extruded protein composition thermally processed with or in a liquid, such as water, a sauce (e.g., barbecue sauce), or a broth (e.g., vegetable broth, chicken broth, or beef broth). In some embodiments, a liquid with or in which an extruded protein composition is thermally processed can include one or more ingredients, such as a coloring agent, a salt, and/or a flavoring agent, that infuse the extruded protein composition with a desired appearance and/or flavor during thermal processing. For example, a protein composition thermally processed in a liquid that includes a beef flavored flavoring agent can result in a thermally processed protein composition having a flavor resembling beef.

A thermally processed protein composition remains substantially intact after thermal processing. That is, a thermally processed protein composition retains a size and shape that is substantially the same as the extruded protein composition (e.g., pieces or shredded) prior to thermal processing. It is to be understood that a thermally processed protein composition need not retain the exact size and shape or nutritional content as compared to the extruded protein composition prior to thermal processing in order to be substantially intact. For example, fat content of a thermally processed protein composition can be reduced during thermal processing. In another example, a small amount of fines from a thermally processed protein product can be present in a liquid in which it was thermally processed.

A thermally processed protein composition can be used alone, or with one or more other suitable ingredients (e.g., a sauce, a broth, vegetables, seasonings, and the like) in a packaged food product. A packaged food product provided herein can be any type of shelf stable or refrigerator stable food product in a hermetically sealed container. For example, a packaged food product can be a shelf stable or refrigerator stable soup. In another example, a packaged food product can be an extruded protein composition that is shredded to result in a shredded protein product, e.g., to resemble pulled pork or shredded chicken.

Suitable packages include any hermetically sealed container including, for example, a can, a pouch, a box (e.g., Tetra Pak®), a tray, a tub, or a bowl. In some embodiments, an extruded protein composition is thermally processed in a hermetically sealed container to produce a packaged food product. In other embodiments, an extruded protein composition is thermally processed before being packaged (e.g., under aseptic conditions and/or in a sterile atmosphere) in a hermetically sealed container to produce a packaged food product.

EXAMPLES

Example 1

Various protein compositions were made according to Table 1, with protein content and oil content provided as a percent dry weight based on the extruded product and moisture content provided as percent weight of the extruded product. Briefly, for each composition, a stream comprising a proteinaceous composition was produced with a moisture content of from about 47% to about 55% by weight, a protein content (from soy protein isolate (SPI)) of about 57% to about 78% by dry weight, and an oil content of about 5% to about 15% by dry weight, using a modular twin screw extruder having 7 sections with the first section not heated, the second, third, and fourth sections having a temperature of 180° F., 200° F., and 210° F., respectively, and with sections 5-7 having a temperature of from about 270° F. to about 300° F. The temperature of sections 5-7 are shown in Table 1 as "barrel temperature." The stream was fed into an elongated die having a round cross-section with an inner diameter of about 1⅜ inches (34.9 mm) and a length of about 3 feet (914.4 mm), cooled, and extruded to produce a protein composition having fibers oriented in a generally parallel orientation.

TABLE 1

| Sample | Protein % dry | Moisture % | Oil % dry | Barrel Temperature ° F. |
|---|---|---|---|---|
| 1 | 64.0 | 49.5 | 5.1 | 270 |
| 2 | 57.2 | 46.7 | 15.2 | 270 |
| 3 | 64.0 | 54.4 | 5.1 | 270 |
| 4 | 57.3 | 51.6 | 15.1 | 270 |
| 5 | 60.6 | 50.6 | 10.2 | 300 |
| 6 | 64.1 | 49.4 | 5.1 | 330 |
| 7 | 57.2 | 46.7 | 15.2 | 330 |
| 8 | 64.1 | 54.4 | 5.1 | 330 |
| 9 | 57.2 | 51.6 | 15.2 | 330 |
| 10 | 68.8 | 50.4 | 10.1 | 270 |
| 11 | 68.8 | 48.1 | 10.2 | 300 |
| 12 | 72.6 | 52.0 | 5.1 | 300 |
| 13 | 68.7 | 50.6 | 10.2 | 300 |
| 14 | 64.9 | 49.2 | 15.2 | 300 |
| 15 | 68.7 | 52.9 | 10.2 | 300 |
| 16 | 68.7 | 50.7 | 10.2 | 315 |
| 17 | 72.6 | 49.5 | 5.1 | 270 |
| 18 | 64.9 | 46.7 | 15.2 | 270 |
| 19 | 72.6 | 54.3 | 5.1 | 270 |
| 20 | 64.9 | 51.8 | 15.2 | 270 |
| 21 | 68.7 | 50.7 | 10.2 | 300 |
| 22 | 72.6 | 49.4 | 5.1 | 315 |
| 23 | 64.9 | 46.6 | 15.1 | 315 |
| 24 | 72.3 | 54.5 | 5.5 | 315 |
| 25 | 64.9 | 51.6 | 15.1 | 315 |

Each of the samples from Table 1 were cut into cubed pieces approximately 0.5 inch on a side and placed into chicken broth. The pieces in broth were then put into metal cans and thermally processed in a water immersion rotary retort at 265° F. and 10 rpm for 16 minutes. Commercially available meat analogs resembling chicken, including a soy and pea protein based product (A), a fungal protein based product (B), and a soy and gluten protein based product (C), were also cut into pieces, placed into chicken broth in cans, and thermally processed as done with the samples in Table 1.

Following thermal processing, each sample and commercial product was evaluated for the ability to remain intact during thermal processing, and to measure hardness, cohesiveness, chewiness, and springiness. Hardness, cohesiveness, chewiness, and springiness were measured as described above. In addition, each sample and commercial product was tasted to evaluate general likeability. The results are shown in Table 2, with the five most liked samples listed first, followed by the commercially available products.

TABLE 2

| Sample/ Product | Intact (Y/N) | Hardness (kg) | Cohesiveness (unitless) | Chewiness (kg*mm) | Springiness (unitless) |
|---|---|---|---|---|---|
| 12 | Y | 3.2 | 0.63 | 10.2 | 0.91 |
| 17 | Y | 5.7 | 0.60 | 23.0 | 0.96 |
| 19 | Y | 5.8 | 0.60 | 23.7 | 0.93 |
| 21 | Y | 3.7 | 0.54 | 14.2 | 0.92 |
| 24 | Y | 4.6 | 0.67 | 17.1 | 0.94 |
| Range for samples 12, 17, 19, 21, and 24 | | 3.2-5.8 | 0.54-0.67 | 10.2-23.7 | 0.91-0.96 |
| A | Y | 0.5 | 0.80 | 1.38 | 0.88 |
| B | Y | 0.6 | 0.66 | 2.39 | 0.87 |
| C | N | — | — | — | — |
| 1 | Y | 4.1 | 0.64 | 14.1 | 0.90 |
| 2 | Y | 5.1 | 0.60 | 18.0 | 0.89 |
| 3 | Y | 3.8 | 0.62 | 13.5 | 0.90 |
| 4 | N | — | — | — | — |
| 5 | Y | 2.9 | 0.58 | 9.9 | 0.88 |
| 6 | Y | 1.1 | 0.52 | 3.3 | 0.80 |
| 7 | Y | 1.6 | 0.55 | 5.3 | 0.91 |
| 8 | Y | 2.3 | 0.53 | 8.6 | 0.88 |
| 9 | N | — | — | — | — |
| 10 | Y | 3.8 | 0.54 | 14.3 | 0.87 |
| 11 | Y | 2.9 | 0.56 | 10.5 | 0.91 |
| 13 | Y | 2.5 | 0.60 | 8.6 | 0.92 |
| 14 | Y | 2.8 | 0.53 | 10.9 | 0.91 |
| 15 | Y | 2.4 | 0.60 | 8.3 | 0.94 |
| 16 | Y | 2.6 | 0.58 | 9.1 | 0.92 |
| 18 | Y | 2.7 | 0.50 | 10.7 | 0.94 |
| 20 | Y | 1.6 | 0.50 | 6.4 | 0.91 |
| 22 | Y | 6.0 | 0.68 | 25.7 | 0.93 |
| 23 | Y | 5.2 | 0.69 | 22.2 | 1.0 |
| 25 | Y | 5.1 | 0.61 | 20.5 | 0.95 |

Example 2

In order to further evaluate the effect of protein content, moisture content, and barrel temperature of the extruder on thermally processed protein compositions, additional samples were produced according to Table 3, using a modular twin screw extruder having 7 sections in a similar protocol to Example 1. However, instead of a round die, an annular die was used. The annular die had a length of 3 feet (914.4 mm), an inner diameter of the outer pipe of 2⅜ inches (60.3 mm), an outer diameter of the inner tube of 1½ inches (38.1 mm), resulting in a gap thickness (space between the outer pipe and inner tube) of 7/16 inch (11.1 mm) and a ratio of the length of the die to the gap thickness of the die of 82.3:1. Table 3 provides values for protein content and oil content as a percent dry weight based on the extruded product and moisture content as percent weight of the extruded product. Barrel temperature in Table 3 is the temperature of sections 5-7.

TABLE 3

| Sample | Protein % dry | Moisture % | Oil % dry | Barrel Temperature ° F. |
|---|---|---|---|---|
| 26 | 84.1 | 55.3 | 3.7 | 310 |
| 27 | 83.9 | 48.4 | 3.9 | 310 |
| 28 | 83.8 | 48.4 | 4.0 | 270 |
| 29 | 83.8 | 55.2 | 4.0 | 270 |
| 30 | 79.6 | 55.3 | 3.9 | 270 |
| 31 | 79.6 | 48.5 | 3.9 | 270 |
| 32 | 79.6 | 48.3 | 3.8 | 310 |
| 33 | 79.6 | 55.3 | 3.9 | 310 |

TABLE 3-continued

| Sample | Protein % dry | Moisture % | Oil % dry | Barrel Temperature ° F. |
|---|---|---|---|---|
| 34 | 75.3 | 55.5 | 3.9 | 310 |
| 35 | 75.3 | 48.3 | 3.8 | 310 |
| 36 | 75.3 | 48.3 | 3.8 | 270 |
| 37 | 75.3 | 55.3 | 3.9 | 270 |

The samples from Table 3 were cut into cubed pieces approximately 0.5 inches on a side, placed in broth, and thermally processed as in Example 1. All samples remained intact following thermal processing. Hardness, cohesiveness, chewiness, and springiness were measured as described above. In addition, each sample and commercial product was tasted to evaluate general likeability. Hardness, cohesiveness, chewiness, and springiness measurements are provided in Table 4, with the three most liked samples listed first, followed by the remaining samples.

TABLE 4

| Sample/ Product | Hardness (kg) | Cohesiveness (unitless) | Chewiness (kg*mm) | Springiness (unitless) |
|---|---|---|---|---|
| 31 | 5.3 | 0.59 | 23.7 | 0.99 |
| 33 | 4.4 | 0.54 | 22.1 | 0.94 |
| 37 | 3.8 | 0.56 | 17.6 | 0.98 |
| Range for sample 31, 33, and 37 | 3.8-5.3 | 0.54-0.59 | 17.6-23.7 | 0.94-0.99 |
| 27 | 8.7 | 0.68 | 40.5 | 1.01 |
| 28 | 4.1 | 0.50 | 19.8 | 0.99 |
| 29 | 5.9 | 0.73 | 25.7 | 1.04 |
| 30 | 3.4 | 0.46 | 17.7 | 0.96 |
| 32 | 4.8 | 0.54 | 23.0 | 1.00 |
| 34 | 3.1 | 0.65 | 14.5 | 1.01 |
| 35 | 2.7 | 0.53 | 13.2 | 0.99 |
| 36 | 4.1 | 0.53 | 18.8 | 0.97 |

A shredded thermally processed protein composition product was produced that mimics a shredded pork product. Briefly, a protein composition similar to Sample 12 from Table 1 was produced. The protein composition was cut into pieces approximately 4 inches in length and each piece was pulled by hand along the orientation of the protein fibers to result in thin, elongated pieces with an appearance similar to shredded meat (e.g., pork, chicken, or beef). The pieces were mixed with a barbecue sauce in a 1:1 ratio by weight and placed in either trays, which were sealed with film after filling, or pouches, which were sealed after filling. The trays and pouches were placed in a water immersion retort system and treated at 255° F. for approximately 45 minutes, including come-up time. Following retort, it was observed that the shredded pieces of the thermally processed protein composition remained substantially intact compared to the protein composition prior to thermal processing, with few fines found in the sauce.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of making a packaged food product, comprising:
   a. producing a heat stable extruded protein composition from a stream comprising a proteinaceous composition having a protein content of about 70% to about 85% by dry weight, a moisture content of from about 45% to about 56%, and an oil content of about 3% to about 10% by dry weight at a barrel temperature of from about 270° F. to about 330° F.;
   b. producing a thermally processed protein composition by applying to the heat stable extruded protein composition heat in an amount sufficient to render the heat stable extruded protein composition pasteurized or commercially sterile, the thermally processed protein composition having protein fibers in a generally parallel orientation and having a protein content of about 70% to about 85% by dry weight, a hardness greater than 3 kg, a chewiness greater than 10 kg*mm, and a springiness of at least 0.90; and
   c. packaging the thermally processed protein composition in a hermetically sealed container.

2. The method of claim 1, wherein the heat stable extruded protein composition is placed in the hermetically sealed container prior to applying heat to produce the thermally processed protein composition.

3. The method of claim 1, wherein the heat stable extruded protein composition is thermally processed with or in a liquid comprising a coloring agent or a flavoring agent.

4. The method of claim 3, wherein the liquid is a sauce or a broth.

5. The method of claim 1, wherein the hardness is greater than 4.5 kg.

6. The method of claim 1, wherein the chewiness is greater than 15 kg*mm.

7. The method of claim 1, wherein the protein composition has a cohesiveness of greater than 0.5.

8. The method of claim 1, wherein the hermetically sealed container is a can or a pouch.

9. The method of claim 1, wherein producing the heat stable extruded protein composition includes producing the stream comprising the proteinaceous composition in a modular extruder having one or more sections and extruding the stream through an elongated die to form the heat stable extruded protein composition with protein fibers oriented in a generally parallel orientation.

10. The method of claim 9, wherein the temperature is from 270° F. to 330° F. in final sections of the extruder.

11. The method of claim 1, wherein the protein content comprises a soy protein isolate.

12. The method of claim 1, wherein the thermally processed protein composition comprises a starch, a hydrocolloid, or a softener.

13. The method of claim 1, wherein applying heat in an amount sufficient to render the heat stable extruded protein composition pasteurized or commercially sterile includes retorting.

* * * * *